April 1, 1958 E. L. BLEIER 2,829,318

AUTOMATIC TELEPHONE SWITCH BANK MULTIPLE

Filed Sept. 23, 1953 2 Sheets-Sheet 1

INVENTOR.
ERNEST L. BLEIER

BY T. L. Bowes

ATTORNEY

April 1, 1958 E. L. BLEIER 2,829,318

AUTOMATIC TELEPHONE SWITCH BANK MULTIPLE

Filed Sept. 23, 1953 2 Sheets-Sheet 2

INVENTOR.
ERNEST L. BLEIER
BY T. L. Bowes
ATTORNEY 2,829,318
Patented Apr. 1, 1958

2,829,318

AUTOMATIC TELEPHONE SWITCH BANK MULTIPLE

Ernest L. Bleier, Fairport, N. Y., assignor, by mesne assignments, to General Dynamics Corporation, a corporation of Delaware Application September 23, 1953, Serial No. 381,791

10 Claims. (Cl. 317—112)

The present invention relates to a bare wire multiple and more particularly to mechanism for arranging for slip multiple for switches using a rigid bare wire multiple bank.

The principle of multiple slipping is well known in the telephone art. A group of identical flat type switches have access through their contacts to a common group of trunks which terminate on the conductors of the multiple bank of each switch in the manner shown and described in United States Patent 2,239,329—Lindstrom. In the case of two motion switches, these terminals are arranged in a plurality of levels so that any switch in the group may be stepped away in a primary direction from its home position to select one of the plurality of levels; following the primary movement the switch is automatically stepped away from the normal secondary position to select an idle trunk in the selected level. When an idle trunk is found by the switch, the switch connects to and marks busy the selected trunk. All switches in such a system are arranged to hunt for an idle trunk until such a trunk is found or on all trunks busy condition is encountered.

If a straight-through multiple system is used in any one level of the above described system, each trunk appears on terminals located at the same relative position in the contact bank of each switch. Thus, when any switch selects a particular level and hunts over the terminals of that level, the trunks are tested in the same order no matter which switch in the group does the testing. This arrangement carries with it the inherent disadvantage that the trunks nearest to the normal secondary position are the first choice of each switch and consequently the most frequently used, while trunks terminated more remotely from the normal secondary position are a less desirable choice and consequently carry a smaller traffic load.

To overcome the unbalanced traffic condition at least partially that results from the use of a straight through multiple system, it is a well known principle in the telephone art to arrange the appearance of the trunks terminating on any one level and accessible to a particular group of switches so that they appear in different relative positions within the same level at each switch and so that any particular trunk considered a first choice by a first switch is considered a second choice by a second switch, a third choice by a third switch, etc.

Previous to this invention, it was not considered practical to arrange switches using rigid bare wire multiples to provide for a slip multiple system due to the impracticality of using a bare wire bank in which each conductor was terminated at each separator block and suitably connected to provide the slip. Accordingly, it is an object of my invention to provide a new and improved form of bank multiple.

In carrying out the foregoing object, I provide a bare wire bank multiple section comprising generally rectangular insulating blocks and wire conductors. The blocks are arranged so that conductors received by bores in the insulator block, which are at an angle to the paths of the conductors prior to entry, are displaced horizontally at each insulator block by a distance equal to the separation of the conductors prior to entry. A multiple made up of such sections provides a system of the above described type that accomplishes the above-described slipping function.

Figure 1:
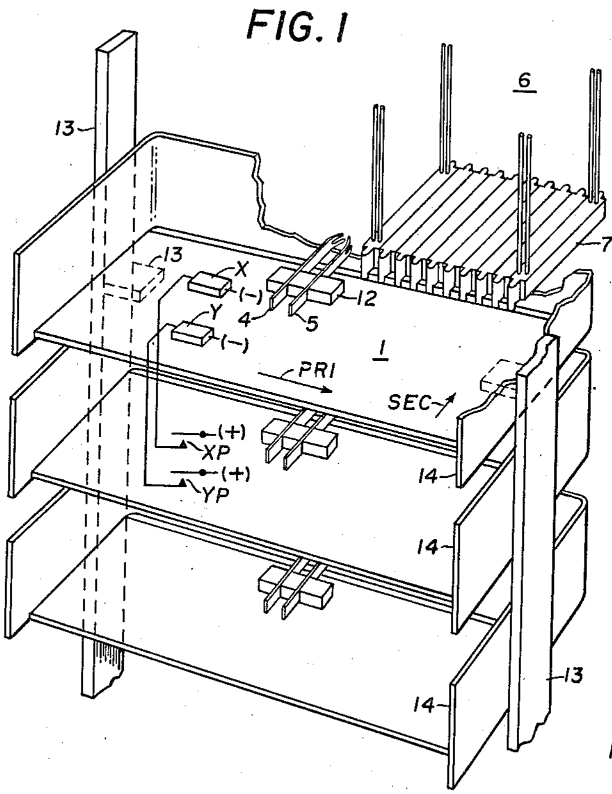
Fig. 1 shows a perspective view of skeletonized switches and assembled wire bank multiple.

Referring to Fig. 1, there is shown a two-motion, flat type switch 1, such as that sold under the trademark "XY," suitable for use with a wire bank multiple. A group of these switches are mounted in cells 14 in vertical spaced alignment. The cells 14 are mounted on a frame 13 by means which are not shown since it has no bearing on the present invention. A more detailed description of switches of this type may be found in United States Patent 2,506,730 to F. A. Morris. It is to be noted that the switch shown in Fig. 1 shows only two wipers, 4 and 5, for reasons of simplicity of description, whereas the switch disclosed in the Morris patent shows two pairs of wipers.

The wire bank multiple is positioned so that the portions of its conductors that lie between insulator blocks such as 7, 8, 9, 10 and 11 run in a vertical direction and at right angles to the two motion paths of the switches as shown in Fig. 1.

Directive impulses from an external source are utilized to energize magnet X to cause the switch carriage 12, which bears wipers 4 and 5, to be stepped in its primary direction (indicated by the arrow labeled PRI in Fig. 1) thus moving the wipers across the face of the multiple bank closest to the switch. This surface will hereafter be referred to as the front face or front end of the multiple. At the conclusion of stepping in the primary direction, wipers 4 and 5 are positioned in alignment with a pair of rows of conductors representing a level of the multiple bank.

After the movement of carriage 12 in the primary direction is completed to align the brushes opposite a particular level, a suitable circuit, not shown, is provided to automatically supply stepping pulses to a secondary magnet Y and start the automatic secondary stepping motion of the wipers (in the direction indicated by the arrow labeled SEC in Fig. 1) in the conventional manner. A test circuit within the switch, not shown, tests the successive conductors to determine whether or not the multiple conductors under test are being used in a connection by another switch. Should the conductors prove to be in use, the automatic stepping circuit is arranged to advance the wipers 4 and 5 one step in the secondary direction to establish contact between the wipers and the next pair of conductors in the selected level. This process is repeated until the switch encounters a pair of conductors which are idle or until the switch is stepped to the overflow position in the event all the pairs of conductors tested are busy.

Figure 2:
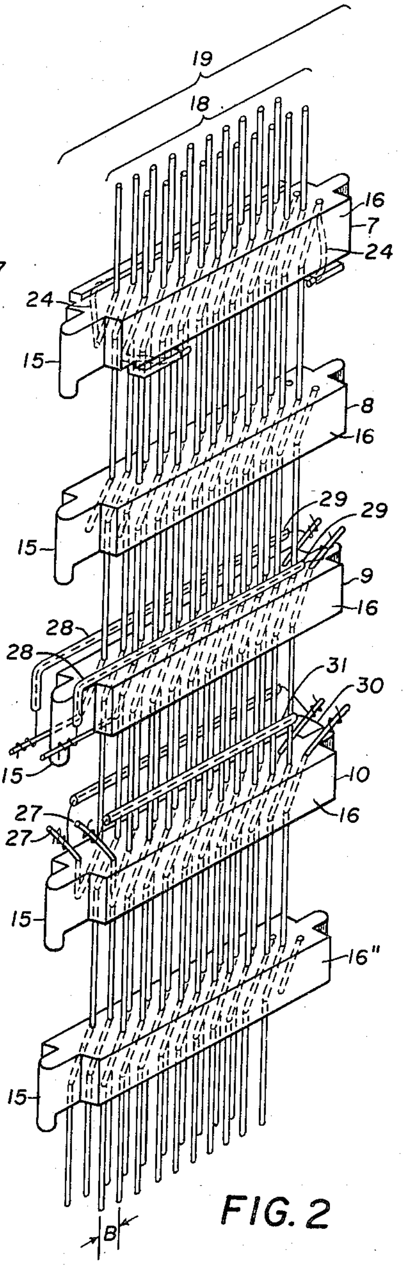
Fig. 2 shows a perspective view of a single section of multiple wire bank.
Figure 3:
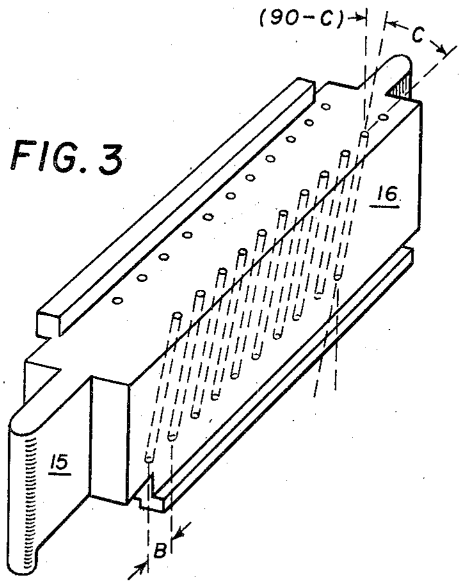
Fig. 3 shows a perspective view of an insulator block suitable for use in a section of wire bank multiple.

The wire bank multiple 6 comprises vertical subassemblies 19, one of which is shown in Fig. 2. Each section comprises spaced apart insulating blocks such as 7, 8, 9, 10 and 11 and bare wire conductors 18, shown in their assembled relationship in Fig. 2. Each vertical subassembly represents one level of the multiple to which the wipers of the group of switches 1 have access. The front end of each insulator block such as the one shown in Fig. 3 is positioned on the corresponding switch cell 14, as by means of recess 17 in the block which cooperates with a portion on each cell. The back portion 16 of the insulator blocks is suitably positioned to locate the assembled multiple with respect to the cell so that each section is accurately located with reference to switch such as cells 14 and switches 1.

Figures 4, 5:
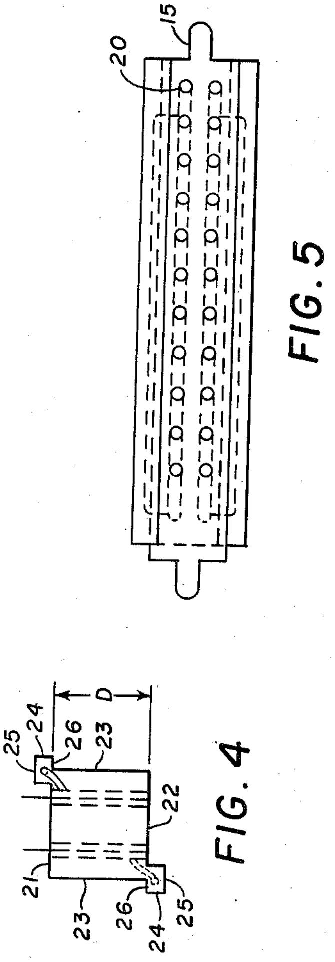
Figs. 4 and 5 show a front elevation and a plan view, respectively of an insulator block of the type used in the wire bank multiple shown in Figs. 1 and 2.

The insulator blocks, shown in detail in Figs. 3, 4 and 5 are substantially rectangular in shape and have top and bottom surfaces 21 and 22, respectively, and side surfaces 23. Each block is of uniform thickness D and is pierced from top to bottom by two rows of bores, the axes of the bores in each row lying in two planes parallel to side surfaces 23. The axes of the bores are parallel and are oriented so that they form an angle C with the top surface 21 of the insulator block. Each bore in one of the rows has a corresponding bore in the other row. Each bore receives one of the bare wire conductors 18.

In the sections of multiple lying between the insulator blocks to which the wipers of the switches 1 have access, the conductors 18 in either plane are spaced apart by an equal distance B. This distance is in turn equal to the distance traveled by the wipers 4 and 5 of the switches 1 each time the switches are stepped one step in the secondary direction. Thus, with the switches in the cells positioned properly, the wipers 4 and 5 make contact with a pair of conductors in each level at each secondary step taken by the switch.

Conductors 18 entering a top surface 21 of any insulator block in subassembly 19 are bent through an angle equal to the complement of angle C (made by the axis of the bore receiving the conductor and the top surface 21 of the block). The same conductor is bent through an angle equal but opposite to the one described above at the exit point of the conductor at the bottom surface 22 of the same insulator block. The axis of the conductor immediately above the block is parallel to the axis of the same conductor at a point immediately below the block. The degree of the angle C is sufficient in view of the thickness D of the insulator block to displace the axis of the entering conductor from the axis of the same conductor emerging from the bottom surface by distance B. This places the axis of any conductor entering surface 21 on a line concurrent with the axis of one of the adjacent conductors in the same row as it emerges from the bottom surface 22 of the same block.

The conductors received by the pair of bores closest to the end portions of any one insulator block are terminated; at front end 15 the terminating conductors enter from the top surface; at the back end 16 the terminating conductors enter from the bottom surface. At each block and in each row of conductors, the conductor received by the bore terminating closest to front portion 15 of the insulator block is electrically connected to the conductor received by the bore closest to the back portion 16.

Figure 6:
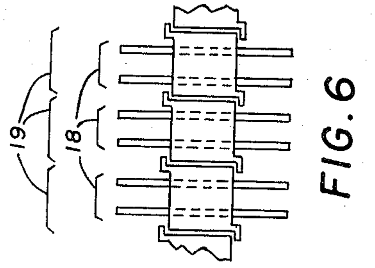
Fig. 6 is a detail of a front elevation of an assembled wire bank multiple such as the one shown in Fig. 1 and showing a typical assembled relationship between insulator blocks of adjacent wire bank sections.

A first method of connecting the terminating front and back conductors is by means of a wire 25 embedded within projection 24 of the insulating block 7. These projections extend from the top and bottom surfaces 21 and 22 and are arranged so that the inner, horizontal surfaces 26 are coplanar with top surface 21 and bottom surface 22, respectively. The ends of the embedded conductors are directed toward the center of the block and terminate in the bores receiving the terminating multiple conductors of the group 18 in such a manner that electrical contact between the terminating conductors and the embedded conductors is effected. The positioning of projections 24 on the block is such that when the multiple bank 6 is assembled from its component subassemblies 19, side surfaces 23 of corresponding insulator blocks in each section engage corresponding side surfaces of a similar insulator block in the adjacent section. Projections 24, being coplanar with the associated top and bottom surfaces, overlap the adjacent block and are substantially in contact with the corresponding top and bottom surfaces of the insulator block in the adjacent section as shown in Fig. 6.

Other methods of connecting the wire bank conductors that terminate at the front and back ends of each insulator block are also shown in Fig. 2. At insulator block 9, the terminating conductors are extended through the block far enough to allow jumper conductor 29 to be attached to each terminating conductor. Conductor 29 is preferably covered with insulating material to prevent the conductor from shorting to other conductors of the group 18.

A variation of the above-described method comprises short conductors 27 run vertically into the top surface of block 10 to connect electrically with the multiple conductors 18 terminating closest to the front portion 15 of the block and a jumper conductor 30 between conductor 27 and the extension of the conductor 18 which terminates at the bore closest to the back portion 16 of the insulator block 10. As in the preceding case, the jumper 30 is preferably covered with insulation 31 to prevent shorts.

Figures 7, 8:
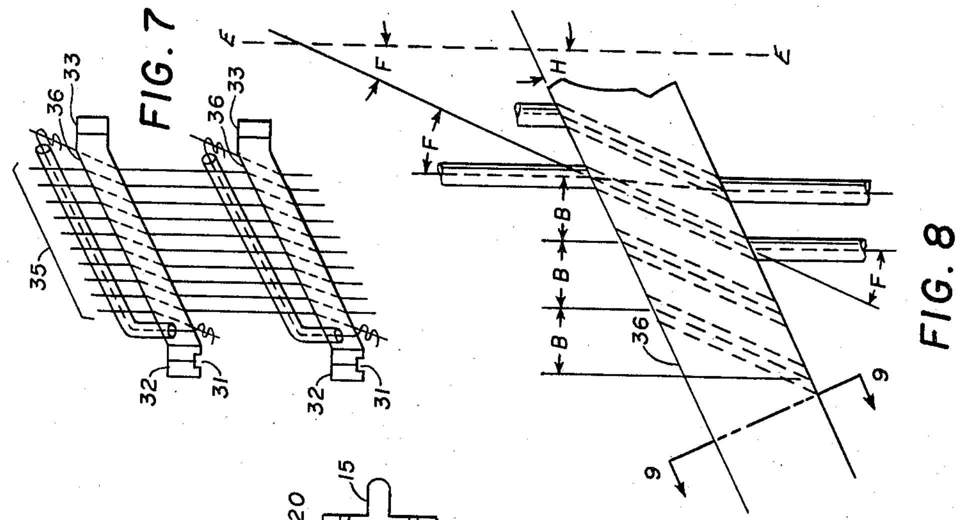
Figs. 7, 8 and 9 show a side elevation, a detail and a cross section (taken through section 8—8 of Fig. 8), respectively, of an insulator block of a somewhat different shape but suitable for use in a wire bank multiple of the type to be described.
Figure 9:
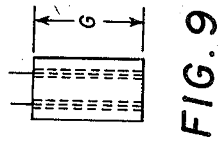

In the event that it is desirable to use a bare wire multiple where the top and bottom surfaces of the insulator blocks do not intersect the paths of the bare wire conductors 18 running between blocks at right angles, it is possible to make use of a block such as shown in Figs. 7, 8 and 9 to achieve a slipped multiple system of the type described. It is to be noted that these blocks have front and back portions 32 and 33, respectively, and that recess 31 is provided to cooperate with the switch cell in order to position the front end of the assembled multiple with respect to the switch cell. As in the previously described case, the bores passing through the insulator block which receive conductors 35 are arranged in two rows so that their axes are parallel to each other. A reference plane EE runs parallel to the paths of the sections of conductors 35 lying between insulator blocks and at an angle to the rows of bores. This reference plane is shown as a dashed line in Fig. 8 since it is perpendicular to the plane of the drawing. The plane forms acute angles F and H with the axis of each bore and the top surface 36, respectively. Conductors 35 entering the top surface of any one insulator block are bent through angle F and through an equal but opposite angle at the exit point of the conductor from the insulator block at the bottom surface. The degree of the angle F is sufficient in view of the thickness G of the block and the degree of angle H to displace the axis of the emergent conductor from the axis of the entering conductor by a distance B. Thus it is that the axis of a conductor preceding the entry into the top surface of a block is on a line concurrent with the axis of an adjacent conductor in the same row leaving the block at the bottom surface.

In the above description of the slipped bare wire multiple bank, the slipping is accomplished at the rate of one trunk for each section of multiple. It may sometimes be desirable to accomplish this slipping at an increased rate, that is, at the rate of two of more trunks displaced for each length of multiple. Any of the above described methods may be modified to be adapted to this type of system as follows.

The bores passing through each insulator block are oriented at an angle sufficient in view of the thickness of the block and its orientation with respect to those sections of the bare wire conductors lying between insulator blocks so that a displacement of the axes of the insulator wires between the point of entry at the top surface and the point of exit at the bottom surface is a multiple *n* of the distance B between the axes of wires measured along the surface of the insulator blocks where *n* is an integer. The integer *n* is equal to the number of trunks that are required to be slipped at each insulator block. In each row of conductors the first *n* wires closest to the front and back portions are terminated. Jumper conductors connecting each wire terminated at the front end to one of the conductors terminating at the back portion may be provided by any one of the above described methods, the number of jumpers for each row of conductors at each block being equal to the number of conductors in each row terminated at one end of the block.

What I claim is:

1. An insulating separator block for use in a subassembly of wire bank multiple comprising a block of insulating material having front and back portions, a side surface, and substantially parallel top and bottom surfaces, a plurality of evenly spaced-apart parallel bores extending through said block from top to bottom, the axes of said bores lying in one or more planes parallel to said side surface, the axes of said bores forming an acute angle with said top and bottom surfaces, the degree of the acute angle thus formed being sufficient to displace the projection onto said top surface of the point of intersection of the axis of any one of said bores and said bottom surface from the point of intersection of the same axis and said top surface by a distance equal to *n* times the distance between the points of intersection of the axes of adjacent bores and said top surface, where *n* is an integer.

2. The insulator block of claim 1 in which said side surface of said block has a projection extending from said front portion to said back portion, *n* conductors embedded in said projection where *n* is the above integer, one end of each of said *n* conductors terminating at one of the first *n* bores closest to said front portion, the other end of each of said *n* conductors terminating at one of the first *n* bores closest to said back portion.

3. An insulating separator block for use in sections of wire bank multiple comprising a block of insulating material having front and back portions, first and second side surfaces, and substantially parallel top and bottom surfaces, a plurality of evenly spaced-apart parallel bores extending through said block from top to bottom, the axes of said bores lying in a plane parallel to said first side surface, the axes of said bores forming an acute angle with said top and bottom surfaces, the degree of the acute angle thus formed being sufficient to displace the projection onto said top surface of the point of intersection of the axis of any one of said bores and said bottom surface from the point of intersection of the same axis with said top surface by a distance equal to *n* times the distance betweeen the points of intersection of the axes of adjacent bores and said top surface where *n* is an integer, a projection on said side surface of said block extending from said front portion to said back portion, *n* conductors embedded in said projection where *n* is the above integer, one end of each of said conductors directed inwardly to one of each of the first *n* bores closest to said front portion, the other end of each of said conductors directed inwardly to one of each of the first *n* bores closest to said back portion, said projection located on said first side surface so that it engages cooperating surfaces on an identical insulator block when said blocks are placed adjacent to each other.

4. In a subassembly of wire bank multiple, a plurality of substantially identical rectangular insulator blocks arranged in spaced-apart, vertical alignment, each of said blocks being pierced from top to bottom by a plurality of rows of parallel, evenly spaced bores disposed at an acute angle with respect to the top and bottom surfaces of said blocks, wire conductors extending through each of said bores thereby providing a section comprising a plurality of conductors in the space between each two adjacent blocks, the degree of said angle being sufficient to offset one of said conductors entering at any one of said bores from any one of said sections sufficiently to place the same conductor emerging from the other side of the block on a line concurrent with one of the conductors in the previously referred to section.

5. In a subassembly of wire bank multiple, a plurality of wire conductors, a plurality of substantially identical insulating separator blocks generally rectangular in shape for retaining said conducors in parallel spaced relationship to each other along their lengths, said blocks having front and back portions oppositely disposed and top, bottom and side surfaces, said blocks being spaced from each other along the length of the subassembly in its assembled relationship, each of said blocks having a plurality of bores extending through each of said blocks from top to bottom, the axes of said bores being parallel to each other and lying in two spaced-apart parallel planes which are also parallel to the side surfaces of said plurality of blocks, each of said bores receiving one of said conductors thereby providing a section comprising a plurality of conductors in the space between each two adjacent blocks, the axes of said bores in each plane being evenly spaced-apart and forming an acute angle with the top and bottom surfaces of said blocks, the degree of the angle being sufficient to displace the point of intersection of the axis of any one of said bores and the bottom surface of any one of said blocks from the point of intersection of the same axis and the top surface of the same block with respect to a line normal to the portions of said conductors lying in said sections by a distance equal to an integer *n* times the projection of the distance between points of intersection of the axes of adjacent bores and said top surface of said block on the same normal line.

6. The subassembly of wire bank multiple in claim 5 in which the conductors received in the first *n* bores where *n* represents the previously referred to integer in each plane closest to said front and back portions are terminated at each of said blocks with the conductors terminated at one end portion entering from said top surface and the conductors terminated at said opposite end portion entering from said bottom surface.

7. In a subassembly of wire bank multiple, a plurality of substantially identical rectangular insulator blocks, said blocks arranged in spaced-apart, vertical alignment and so that the top surfaces of the blocks are parallel to each other, each of said blocks having front and back portions and being pierced from top to bottom by a plurality of rows of parallel, evenly spaced bores, a plurality of wire conductors retained in parallel spaced relationship throughout their lengths, each of said bores adapted to receive one of said plurality of conductors, sections of said subassembly comprising the portions of said conductors lying in the space bounded by each two adjacent blocks, said bores in each of said blocks forming an acute angle with said top surface, the degree of the angle thus formed being sufficient to offset one of said conductors in one of said sections received by one of said bores at the top surface of one of its boundary blocks sufficiently to place the same conductor emerging from the other side of the boundary block on a line concurrent with one of the conductors in the previously referred to section, the conductor nearest one of the end sections in each of said rows entering any one of said blocks from the bottom surface being terminated, the conductor nearest the opposite end section in each of said rows entering the same block from the top side being terminated, and an electrical connection at each block between said terminated wires in any one of said rows.

8. In a subassembly of wire bank multiple, a plurality of wire conductors, a plurality of substantially identical insulating separator blocks generally rectangular in shape for retaining said conductors in parallel spaced relationship to each other along their lengths, front and back portions oppositely disposed and top, bottom and side surfaces associated with each of said blocks, said blocks being spaced from each other along the length of the subassembly in its assembled relationship, sections of said subassembly comprising the portions of said conductors lying in the space bounded by each two adjacent blocks, said conductors in each section being parallel, a plurality of bores extending through each of said blocks from top to bottom, the axes of said bores being parallel to each other and lying in two spaced-apart parallel planes which are also parallel to the side surfaces of said plurality of blocks, each of said bores receiving one of said conductors, the axes of said bores in each plane of any one of said blocks being evenly spaced-apart and forming an acute angle with the top and bottom surfaces of said blocks, the degree of the angle being sufficient to displace the point of intersection of the axis of any one of said bores and the bottom surface of any one of said blocks from the point of intersection of the same axis and the top surface of the same black with respect to a line normal to the portions of said conductors lying in said sections by a distance equal to an integer $n$ times the projection of the distance between the points of intersection of the axes of adjacent bores in said top on the same normal line surface, the conductors received in the first $n$ bores where $n$ is the above integer in each plane closest to each of said front and back portions being terminated at each of said blocks, the conductors terminated at one end portion entering from said top surface and the conductors terminated at said opposite end portion entering from said bottom surface, electrical connections from the individual conductors terminating adjacent to said front portion of each of said blocks to individual conductors terminating at said back portion of the same block.

9. The subassembly of claim 8 having in addition a projection on each side surface of each of said blocks parallel to said top and bottom surfaces and extending substantially from said front portion to said back portion of the block, said conductors being embedded in each of said projections, said projections being so positioned on each of said blocks that they cooperate with corresponding portions of corresponding blocks in adjacent sections of multiple to allow the adjacent side surfaces of the corresponding blocks to engage.

10. An insulated separate block for use in a subassembly of wire bank multiple comprising a block of insulating material having substantially parallel top and bottom surfaces, and a plurality of evenly spaced-apart parallel bores extending through said block from top to bottom at an acute angle with respect to said top and bottom surfaces, the degree of the acute angle being sufficient to displace the projection of the point of intersection of any one of said bores and said bottom surface onto said top surface from the point of intersection of said any one of said bore with said top surface by a distance equal to $n$ times distance between the intersection of the axes of adjacent bores with said top surface, where $n$ is an integer.

References Cited in the file of this patent

UNITED STATES PATENTS

| | | |
|---|---|---|
| 821,876 | Keith | Sept. 25, 1906 |
| 1,279,842 | Clausen | Sept. 24, 1918 |
| 2,148,824 | Lienzen | Feb. 28, 1939 |
| 2,512,908 | Arndt | June 27, 1950 |

FOREIGN PATENTS

| | | |
|---|---|---|
| 394,212 | Germany | Jan. 23, 1925 |
| 585,137 | Britain | Jan. 30, 1947 |